United States Patent [19]
Canziani

[11] Patent Number: 5,161,930
[45] Date of Patent: Nov. 10, 1992

[54] UNIT FOR SORTING AND DISTRIBUTING PACKAGES LIKE PARCELS OR SIMILAR PACKAGES

[76] Inventor: Francesco Canziani, Via Contardo Ferrini 21, 21010 San Macario (Varese), Italy

[21] Appl. No.: 646,651

[22] Filed: Jan. 28, 1991

[30] Foreign Application Priority Data

Jun. 13, 1990 [IT] Italy .................. 20635 A/90

[51] Int. Cl.⁵ ............................ B65G 1/10
[52] U.S. Cl. ...................... 414/331; 104/88; 364/478; 414/273; 414/564; 414/334; 414/339; 198/365; 198/372
[58] Field of Search ............ 364/478; 414/331, 593, 414/334, 336, 348, 340, 339, 390, 398, 528, 540, 541, 564, 913, 283, 273; 198/365, 372; 104/88

[56] References Cited

U.S. PATENT DOCUMENTS

| | | | |
|---|---|---|---|
| 1,047,252 | 12/1912 | Lawson | 414/334 |
| 3,148,631 | 9/1964 | Gorjanc | 104/88 |
| 3,152,705 | 10/1964 | Lammert | 414/564 |
| 3,489,301 | 1/1970 | Miller et al. | 414/340 X |
| 3,850,285 | 11/1974 | Johnson | 414/564 X |
| 4,566,834 | 1/1986 | Baba et al. | 414/331 X |
| 4,721,262 | 1/1988 | Langen | 414/331 X |
| 5,018,928 | 5/1991 | Hartlepp | 414/339 |

FOREIGN PATENT DOCUMENTS

| | | | |
|---|---|---|---|
| 1027119 | 7/1983 | U.S.S.R. | 414/564 |
| 2197633 | 5/1988 | United Kingdom | 414/339 |

Primary Examiner—Frank F. Werner
Attorney, Agent, or Firm—Notaro & Michalos

[57] ABSTRACT

The unit includes an overhead line along which a large number of trollies or sorting containers move. Each is provided with a moving base like a small rotating mat enabling collection and depositing of packages to be sorted along the line. Each of these bases is mounted onto its respective trolley by way of a telescopic structure and along the line there are mechanisms to position each cell at a height corresponding to that of the collection devices where the packages are to be unloaded.

15 Claims, 5 Drawing Sheets

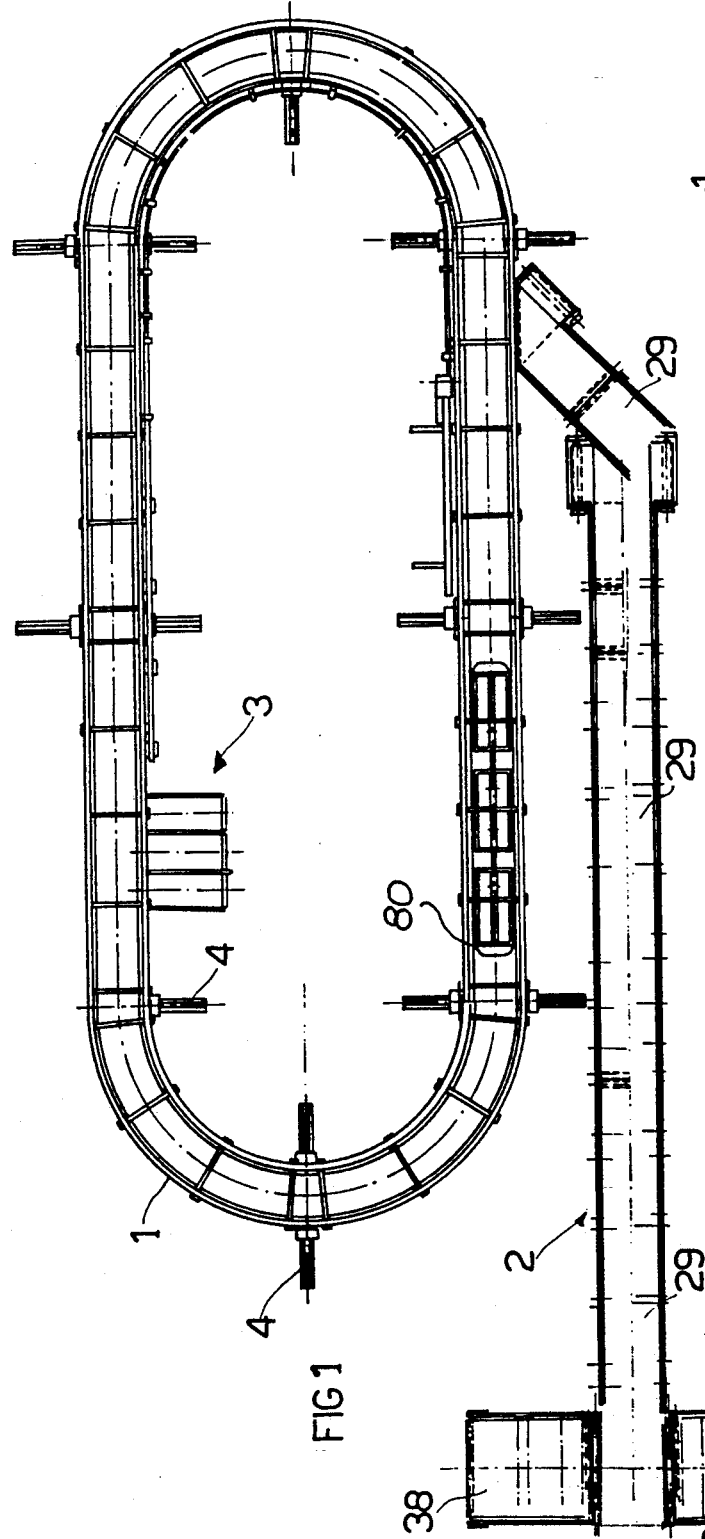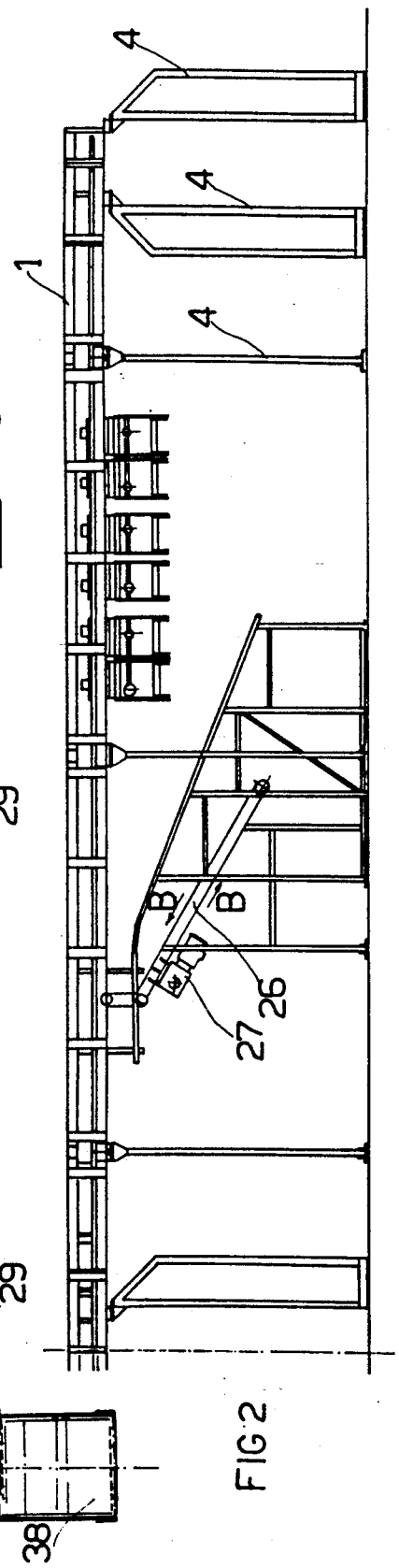

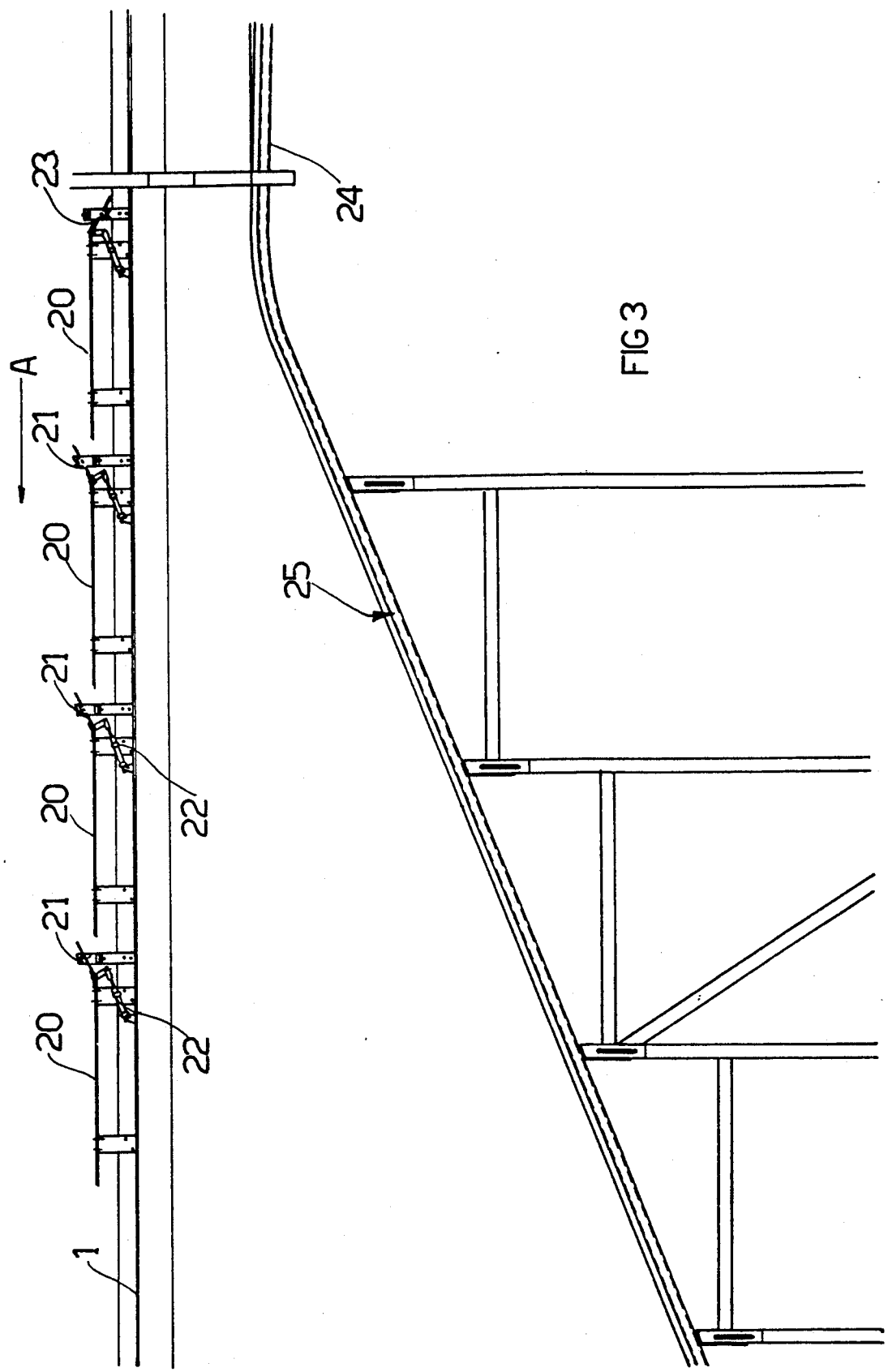

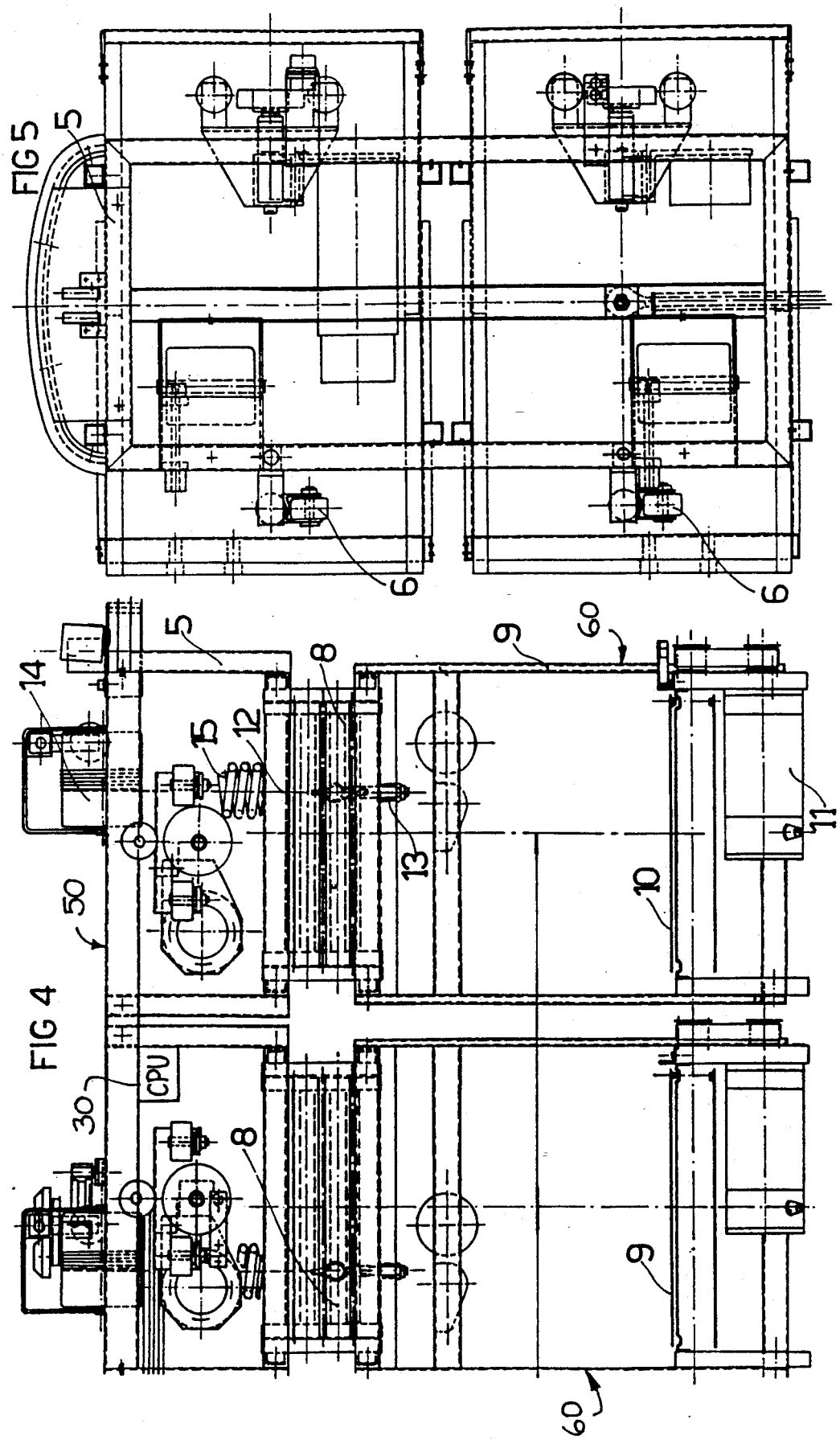

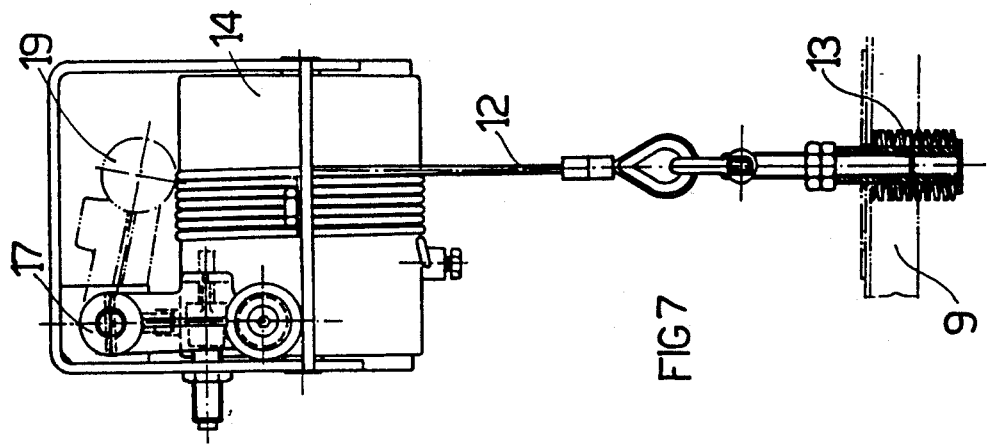
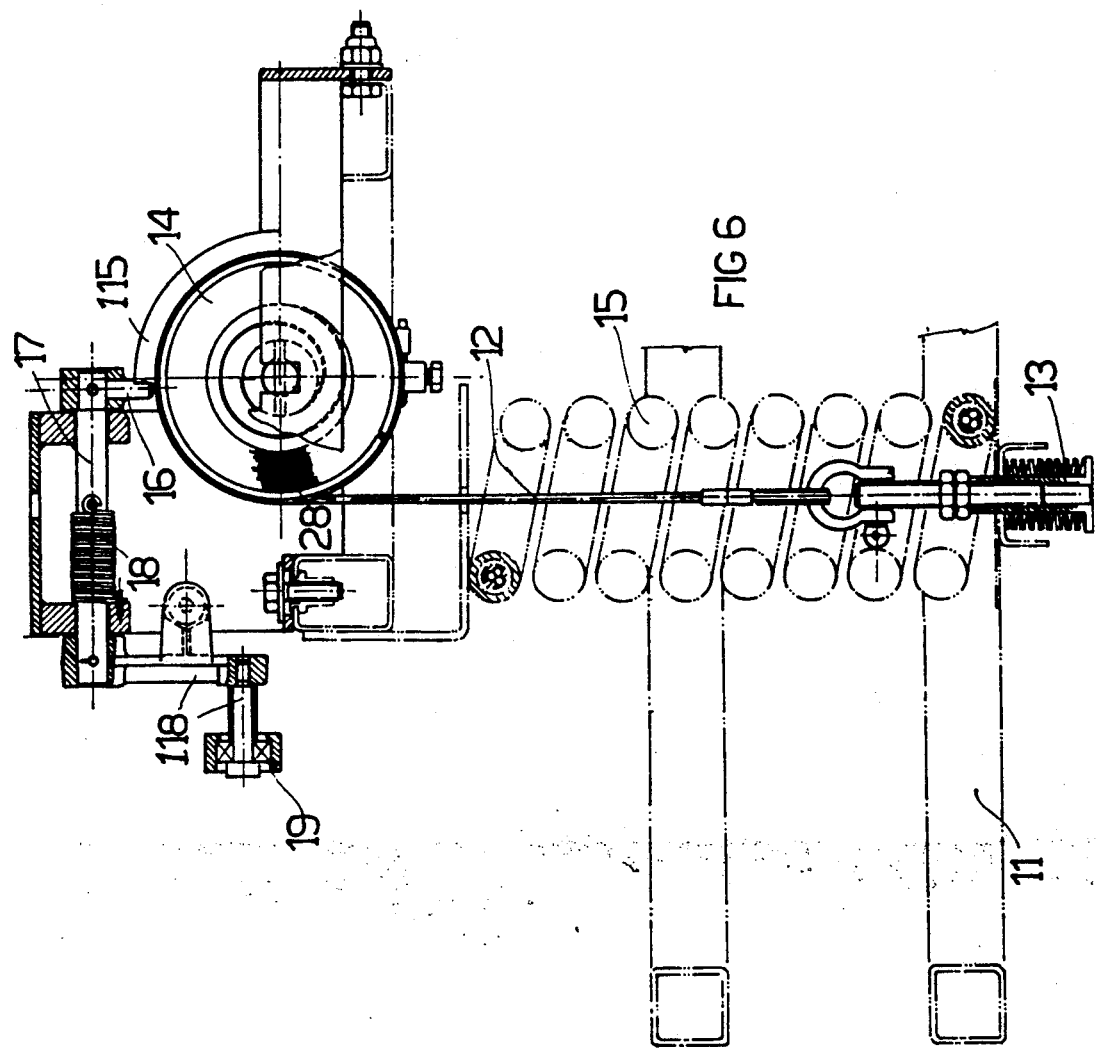

UNIT FOR SORTING AND DISTRIBUTING PACKAGES LIKE PARCELS OR SIMILAR PACKAGES

The present invention proposes a unit for the sorting and distribution of packages like parcels and other such items.

The invention includes a loop overhead line, along which a large number of trollies move, each of which is equipped with a transport base designed to receive the parcel to be sorted and to unload it to one side or the other of the line, when the basket passes corresponding collection devices, which can be preselected. Each transport base, which in the following will be referred to as a "cell", is mounted on its respective trolley by way of a telescopic pantograph, linked to devices that permit the positioning of each cell at a preset height, corresponding to that of the respective collection device, which can be constituted by a chute, a container or something else.

The unit is of the so-called "asynchronous" type, that is to say, that each trolley or each group of trollies can move at different rates along the different sections of the line, so as to maximize performance; for example by increasing the infeed rates in sections where there are no loading or unloading points and slowing down at the moments of unloading the package.

Sorting apparatuses including trollies which move along a fixed path equipped with means to execute the unloading of transported packages are already well-known, for example U.S. Pat. No. 4,712,965 by the same applicant.

This patent describes a plant including a line along which a large number of trollies move, each powered by its own motor and each provided with a rotating mat devised to execute the unloading of transported packages along the line. In this type of unit the collection devices for the unloaded packages are constituted by chutes or by containers, one alongside the other.

The application for an english patent no. 2.197.633A by the same applicant, describes a sorting apparatus of a "synchronous" type, that is of the type that includes a large number of trollies engaged one with the other and which move along a fixed path, operated by means of a belt or chains, or analogous system.

In the apparatus referring to the patent application U.S. Pat. No. 2,197,633 each trolley is equipped with a transport device mounted on a pantograph support which permits the raising of the transport base thus enabling unloading at two different heights.

This positioning occurs either engaging a series of cams arranged along the line and which interact with devices mounted on the trolley, or by way of motors mounted on each trolley which permit the raising of transport base.

This solution, however, presents a number of inconveniences and limitations. Above all it necessitates recourse to quite complicated structures which consequently are heavy and expensive and cause a limitation of the load to be raised by the transport bases, unless use is made of particularly rigid structures which would in turn contribute to making the whole machine even heavier. For the reasons outlined above this type of apparatus is better adapted to plants with a high yield, but with a limited number of collection points, whereas it is less suited to those situations where the packages to be sorted, in numbers not excessively high, must nevertheless be directed to numerous collection points.

A typical case where this situation occurs is that found in large offices, for example government offices or banks, where the quantity of mail is not excessive, but where different parcels must be directed to a large number of addresses.

There is therefore a real need for a mechanism which allows one to sort packages like postal parcels and similar items, directing them to numerous collecting points, a mechanism which, however, is not bulky and which can be easily installed in existing localities.

Preferably this mechanism should be able to unload the parcels in collection receivers distributed on different floors, (at different heights) and it should be light, thereby allowing for installation on the upper floors of a building. Also it should be reliable and safe and be easily accessible for maintenance work.

To resolve the indicated problem the present invention proposes a unit for the sorting and distribution of packages like parcels and similar items, in which a large number of trollies move along a fixed elevated line and a transport and unloading cell is attached to each trolley, by means of a telescopic support which allows positioning at different heights. This allows arrangement of collection mechanisms on more levels, obtaining an elevated number of exits per linear meter of machine. In the apparatus according to the invention the descent of each cell occurs due to gravity, while the mechanisms present on each trolley control the extent of such descent, so as to block each cell at the height corresponding to that of the collection mechanism where the transported package is unloaded.

The present invention will now be described in detail, as an unlimited example, with particular reference to the figures attached in which:

FIG. 1 is a top view of a unit corresponding to the invention;

FIG. 2 is a side view of a unit corresponding to the invention;

FIG. 3 is an elevated side view of a particular aspect of the unit;

FIG. 4 is a side elevational view of a pair of trollies and related cells;

FIG. 5 is a side elevational view of a pair of trollies and related cells;

FIG. 6 is a side elevational view of the control mechanism for height positioning of the cell;

FIG. 7 is an elevated side view of another embodiment of the control mechanism for height positioning of the cell mechanisms for the height positioning of the cells;

Figure 8:
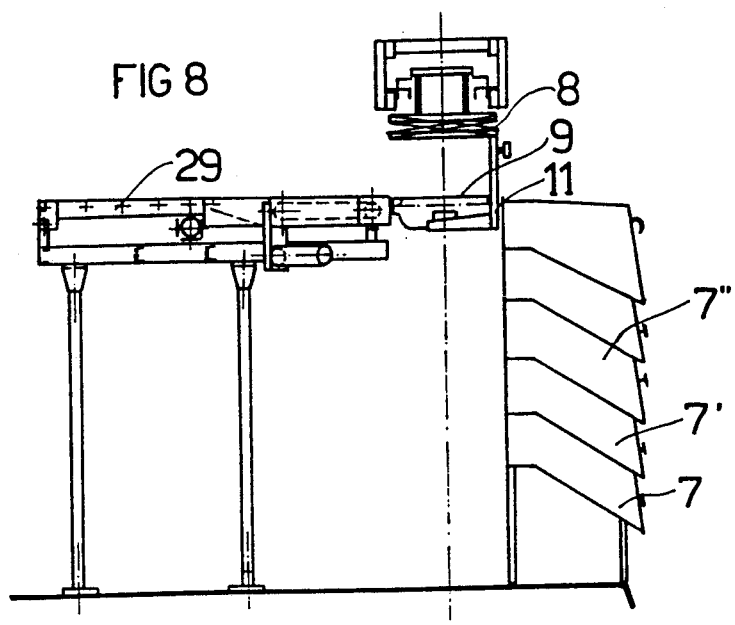
FIG. 8 is an elevated schematic view of a trolley with the related cell at the loading station.

In FIG. 1, the unit according to the invention includes a fixed line of rails or rail line 1 along which the trollies 50 shown in FIGS. 4 and 5 move, and a station 2 for codification and loading of the packages to be sorted and a large number of collection mechanisms 3, in which the packages are unloaded.

Along the rail line 1 the trollies 50 move, drawing power by means of sliding contacts, from power supply bars of a known type arranged in parallel with the rail line 1.

Power supply bars signals can be sent by a central computer which directs the functions of the whole unit, for control of the various trolley functions.

The rails 1 are mounted on a structure composed of a large number of posts 4 positioned preferably at a height which permits the passage of persons below the trollies 50.

The trollies 50 can be disconnected from each other or regrouped in greater numbers so that a certain number of trollies 50 are hooked to each other for greater efficiency. Electronic control apparatuses in the form of a central processing unit, CPU 30 which are mounted on board the trollies 50 are capable, of controlling the functions of several elements.

For example, more series can be planned, each comprising a certain number of trollies hooked to each other.

In the following, the term "boat" 80 will be used to indicate each group of trollies 50 linked between each other and directed by a single CPU 30 mounted on board one of the trollies 50.

In the examples illustrated in the figures, a boat 80 as previously indicated is made up of trollies 50 hooked to each other, and on each one of the trollies 50 are mounted a pair of 60.

Each trolley 50 is provided with 6 wheels 19 which run along the rails 1. The movement is produced by a motor 11, illustrated in FIG. 4 and FIG. 6, fed, as said, by power bars placed along the line 1. According to needs, a motor 11 can be provided on each trolley 50 or a single motor 11 for each boat 80.

According to FIG. 4, on each trolley 50 are mounted a pair of telescopic suports 8 preferably of a pantographic type, to each of which is fixed a support frame 9 for a rotating mat 10 set to rotate by a motor 11. The complex constituted by the frame 9, by the mat 10 and by the related motor 11 constitutes the cell 60 into which are deposited the parcels to be sorted. Each cell 60 is hooked to the extremity of a steel cable 12, by way of an interposing spring 13 in order to soften bumps and/or vibrations. In FIG. 6, the cable 12 is wrapped around a winch 14 and there is provided a spiral 15 arranged around the steel cable 12 to power the motor 11 By turning the winch 14, one unwinds to a greater or lesser extent the cable 12 causing the cell 60 to rise and fall and positioning it at the desired height. A cam 115 is fixed to the winch 14. The cam 115 is engaged by a pivot 16, the pivot 16 connected to an axle 17 mounted on to the frame 5 of the trolley 50. A helical spring 18 or similar item maintains the axle 17 in a position which conducts the pivot 16 to engage the cam 115 in order to keep the winch 14 blocked. An arm 118 is fixed to the axle 17 and at the end of the arm 118 a wheel 19 is mounted. The wheel 19 is engaged by deviators 21 present along the line 1. The deviators 21 unblock the winch 14 and permit the descent of the cell as described below.

The mechanisms which engage the wheel 19 command the descent controlled by the cell are constituted by a large number of deviators 21 placed along the line 1 as illustrated in FIG. 3.

In FIG. 3, there is represented a section of the line 1, corresponding to which the positioning of the cells 60 at the desired height for unloading occurs. In this area there is arranged above one of the rails 1, a second section of rail 20 interrupted by a series of deviators 21 moved by corresponding pneumatic pistons 22 or analogous systems. Each of the pistons 22 acts as an arm attached to a deviator 21 to carry it to a position in which the deviator is aligned with the second section of rail 20, guaranteeing its continuity, at a raised position illustrated in FIG. 3. The direction of movement of the boat along the line 1 and the second section of rail 20 is indicated, in FIG. 3, by A.

At the beginning of the second rail section 20 there is a head deviator 23, commanded by a pneumatic piston 22 to move from a position aligned with the rails 1 to a position inclined downwards as, illustrated in FIG. 3.

Always in this area there is provided, below the line 1, a guide rail 24, is provided for receiving a cell 60 as it descends. An idling wheel 6 mounted on the frame 9 of the cell 60 contacts and moves along the guide rail 24. The guide rail 24 presents an inclined tract 25 which functions as a sort of guide for the cell 60 during the descending movement.

Collection mechanisms 3, constituted by a flanking series of shoots or containers 7, 7', 7", etc. arranged one above the other (FIG. 8) are located at the bottom of the inclined tract 25.

The collection mechanisms 3 for the sorted packages can be arranged according to individual needs and can be arranged on a varying number of levels, which can also be raised.

The and the number of levels can be defined with reference to the dimensions and the type of package and operations which can be required at the bottom of the given mechanisms.

The principal advantage is given by the flexibility in the choice of the mechanism most adapted to the application. In FIG. 2 at the bottom of these collection mechanisms there is a section of inclined rail along which a rotating belt 26 moves and is set in motion by a belt motor 27 which serves as a cell ascent mechanism. The rotating belt 26 moves in the direction of the arrows B in FIG. 2 and its aim is to carry the cell 60 back to the raised starting postion. A second spring 28 shown in FIG. 6 makes the winch 14 rotate in the direction of the rewinding of the cable 12.

The strength of the spring 28 is such that it easily rewinds the cable 12 around the winch 14, but not sufficient to sustain the weight of the cell 60.

According to FIG. 1, the function occurs as follows: the parcels to be sorted, to which a destination code is assigned by an operator, for example by means of a control panel, an optic reading or other known system, are arranged on the loading belts 38 which carry them to a transporter constituted by a sequence of rotating loading mats 29, which unload each parcel in the cell 60 assigned to it (FIG. 2; FIG. 8).

All these loading functions are well known and are therefore not described in detail.

Figure 9:
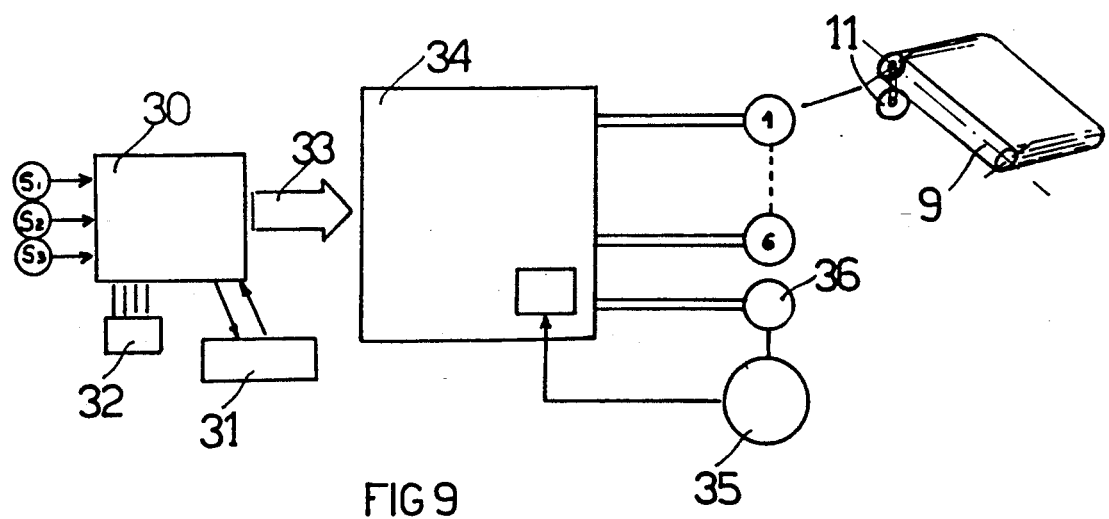
FIG. 9 is a block design of the electronic control mechanisms of a group of trollies.

As mentioned previously, on each boat 80 of trollies 50 that moves along the line 1 there is mounted a microcomputer comprising a CPU 30 (FIG. 9) which receives the command signals from the computer controlling the apparatus by means of a communication interface 31 linked to the central computer by a common method, for example by means of sliding contacts which engage bars arranged along the line, or by means of radio signals etc.

To each CPU 30 mounted on the boats a particular identification code is assigned, appropriately engaging a series of bridges or microswitches present on a module 32.

The CPU 30 is linked, by a BUS 33 to a second module 34 which includes seven functions, six of which serve to control the mat functions present on the cells 60 related to this boat 80 while the seventh controls the motor functions of the boat.

At the sides of the line 1 there is a perforated metallic band, with the perforations at regular intervals.

These perforations are "read" by an encoder mounted on to the boat, and this permits the control computer for the apparatus to know, moment by moment, the exact position along the line of each boat 80 and the single cells 60 mounted on them. A tachometric dynamo 35 is linked to a towing motor 36 which allows one to verify that the forward velocity of the boat 80 corresponds to that expected.

Every time a parcel is introduced into a cell 60, the central computer ensures it is positioned at the height corresponding to the appropriate loading device. The deviators 21 and head deviator 23 act to achieve this end.

The head, deviator 23 serves to command the cell descent, while those that follow control the extent of this movement. By maintaining all the deviators 21 in a horizontal postion, aligned with the second sections 20 of the rail above, the wheel 19 and therefore the axle 17 remain in the position illustrated in FIG. 6, in which the pivot 16 engages the cam 15 of the winch 14 keeping it blocked. On the other hand when a cell must be carried to a lower height, this is done with the head deviator 23, carrying it into the position inclined downwards as shown in FIG. 3.

In this position wheel 19, engaged by the head deviator 23, is shifted upwards and runs along the upper rail 20. This causes a rotation of the axle 17 which shifts the pivot 16 disengaging thereby the cam 115 of the winch.

The weight of the cell 60, superior to the force exercised by the second spring 28, makes the cell 60 descent, moving along the inclined tract 25. The descent of the cell 60 continues until the wheel 19 meets a deviator 21 in an operating position inclined upwards.

The deviator 21 conducts the wheel 19 back to the preceding position, into contact with the rail 1. The pivot 16 also returns to the initial position, intercepting the cam 115 and thereby blocking the winch 14 and the descent of the cell 60.

Obviously the length of the sections 20 of the upper rail are calculated with regard to the different heights at which the the parcels are to be unloaded.

When appropriately preselecting the correct deviator 21, it will be possible to regulate the descent of the cell 60 according to a discrete number of intervals. Varying the number and the position of the cams 115 fixed to the winch 14, it will also be possible, in case of necessity, to block the cells 60 at different heights, and always at discrete intervals and with the certainty of exact positioning. The positioning can also be verified by means of photocells or similar means appropriately arranged.

Alternatively, the descent of the cell 60 can be commanded by an electric motor, for example a step-by-step motor or a C.C. motor coupled to an encoder.

When the boat passes by the unloading area, the central computer commands the rotation of the rotating mat 10, in one direction or another, in order to execute the unloading of the parcel.

At the bottom of the unloading area the cell 60 reaches the ascent mechanism where the rotating belt 26 carries the cell 60 upwards, while the second spring 28 procedes to rewind the cable 12 on to the winch 14, taking it back to a height such that persons may pass under the cell 60, for easy access to the internal part of the unit. Such access is precluded or at any rate made difficult in the known apparatuses. Between cam 115 and the winch 14, a release switch is located which will permit the free rewinding of the steel cable 12 thereby impeding the descent until the cam 115 is first liberated.

Alternatively, various other systems can be provided to conduct the cell 60 upwards, for example electric motors mounted on the trollies 50.

Each boat 80 will then be able to be equipped with mechanisms like a proximity sensor able to register the presence of obstacles or a slower-moving boat on the line, providing a signal which then slows the speed of forward movement.

With the type of unit above described numerous advantages are obtained.

It is indeed possible to reach a very high number of stations with a limited cost structure, that are easy to install, and that are light and adaptable even in places already constructed. Indeed concentrating the destinations of the sorting machine on more levels means a high density of exits per linear meter of machine.

This is due to the fact that the pantograph to which the cells 60 are connected can be sized so as to allow sorting on a high number of variable levels. The unit is also easily accessible from any side, permitting proper and convenient maintenance.

An expert in this field will be able to offer numerous modifications and variations, which must, however, keep within the limits of the present invention.

I claim:

1. A unit supported above a floor for the sorting of packages, the unit comprising:
   a rail line arranged in a fixed path above the floor;
   support means for supporting the rail line at a selected height above the floor;
   a trolley mounted for movement along the rail line;
   control means located on the trolley for powering the trolley;
   a cell for supporting and transferring packages, the cell attached below the trolley by telescopic support means, the telescopic support means fixed between the cell and the trolley and connected to the control means, the telescopic support means positioning the cell at various heights below the trolley in response to the control means;
   loading/unloading means located on the cell for receiving and unloading the packages;
   the loading/unloading means comprising a rotating mat powdered by a cell motor, the cell motor located on the cell, the rotating mat causing the packages to be moved into and out of the cell;
   a loading station located at a first position near the rail line at a load station level for interaction with the cell of the trolley at the load station level by moving packages from the load station to the loading/unloading means of the cell at the load station level;
   a collection mechanism located at a second position near the rail line at a collection level for receiving packages from the loading/unloading means of the cell at the collection level;
   a plurality of deviators positioned along the rail line at predetermined positions, the deviators contacting the trolley as the trolley moves along the rail line, the deviators are pre-set in a first position wherein the deviators interact with the telescopic support means causing the cell to descent from the trolley and a second position wherein the deviators interact with the telescopic support means for blocking the cell from descending from the trolley; and an ascent mechanism located at the rail line and extending downwardly to the collection level wherein the ascent mechanism assists in moving the cell after the cell is unloaded at the collection level of the collection mechanism, the cell being moved upwardly along the ascent mechanism toward the rail line.

2. The unit according to claim 1, wherein the command means controls movement of the cell at discrete intervals.

3. The unit according to claim 2, wherein the telescopic support means comprises a winch fixed to the trolley by a cam, a cable for winding and unwinding on the winch, the cable having one end attached at the winch and an opposite end fixed to the cell such that when the cable is wound around the winch the cell is pulled upward toward the trolley, the cam being rotatable with the winch, rotation of the winch fixed to the cam being effected by a winch blocking means located on the trolley between the rail line and the cam which is engageable with the cam, the winch blocking means being activated by contact with the deviators on the rail line such that when the winch blocking means engages the cam, rotation of the winch is stopped and when the winch blocking means is disengaged from the cam, winch rotation resumes.

4. The unit according to claim 3, wherein the winch blocking means comprises a movable pivot which engages the cam for blocking rotation of the winch, the pivot connected to an axle mounted on the trolley, the axle having an arm extending from the axle, the arm having a wheel, the wheel rotatably moveable along the rail, the pivot being moved into contact with the cam upon the wheel contacting the deviator positioned on the rail.

5. The unit according to claim 1, wherein the cell ascent mechanism comprises a rotating belt inclined at a position below the rail line, the rotating belt engaging the cell after the unloading of packages at the collection level or the collection mechanism and moving the cell upwardly along the rotating belt toward the rail line, through the use of a belt motor.

6. The unit according to claim 1, wherein the loading station comprises a loading mat which is rotatable such that a package is moved along a loading surface of the loading mat to the cell for loading at the loading level.

7. The unit according to claim 1, wherein the collection mechanism comprises a plurality of chutes which serving a sorting function, the chutes located at spaced collection levels below the rail line, the chutes being positioned for receiving packages from the rotating mat of the cell at the collection level.

8. The unit according to claim 7, wherein a guide rail is positioned and inclined below the rail line for receiving and guiding the cell as the cell descends for unloading.

9. The unit according to claim 1, wherein a guide tract is connected below the rail line and supported by the floor, the guide tract being oriented at a downward angle and extending downwardly to the collection mechanism, the guide tract being for receiving and guiding the cell as the cell descends toward the collection mechanism.

10. The unit according to claim 1, wherein the trolley includes a plurality of cells attached to the trolley by an equal number of corresponding telescopic supports.

11. The unit according to claim 10, wherein a plurality of trollies are linked together to form a boat for simultaneous movement along the rail line.

12. The unit according to claim 11, wherein only a single control means located on the boat is used to power the boat along the rail line and is used to control positioning of the cells.

13. The unit according to claim 1, wherein the control means is an electric motor.

14. The unit according to claim 1, wherein the control means is a central processing unit.

15. The unit according to claim 1, wherein said support means comprises a plurality of posts connected between the rail line and the floor at spaced locations along the rail line.

* * * * *